United States Patent [19]

Spaller, Jr. et al.

[11] 3,826,163

[45] July 30, 1974

[54] METHOD FOR APPLYING PRESSURE IN CUTTING ELONGATED FLEXIBLE MATERIAL INTO PREDETERMINED SHORTER LENGTHS, AND APPARATUS FOR PRACTICING THE IMPROVED METHOD

[75] Inventors: Albert E. Spaller, Jr., Johnson City; Bruce W. Stockbridge, Kingsport, both of Tenn.

[73] Assignee: Eastman Kodak Company, Rochester, N.Y.

[22] Filed: July 5, 1973

[21] Appl. No.: 376,490

[52] U.S. Cl............................ 83/18, 83/20, 83/37, 83/346, 83/509, 83/511, 83/913
[51] Int. Cl............................................ D01g 1/04
[58] Field of Search........... 83/18, 20, 37, 346, 348, 83/509, 511, 913

[56] References Cited
UNITED STATES PATENTS

| | | | |
|---|---|---|---|
| 3,557,648 | 1/1971 | Coffin et al............................ | 83/18 |
| 3,733,945 | 5/1973 | Cook .................................. | 83/913 X |
| 3,744,361 | 7/1973 | VanDoorn ............................ | 83/37 |
| 3,777,610 | 12/1973 | Spaller............................... | 83/913 X |

Primary Examiner—Donald R. Schran
Attorney, Agent, or Firm—Malcolm G. Dunn

[57] ABSTRACT

Improved method for applying pressure in cutting elongated flexible material in the manner by which cutting occurs in the Keith U.S. Pat. No. 3,485,120 and the Coffin et al. U.S. Pat. No. 3,557,648, and to apparatus for practicing the method. The elongated flexible material is continuously wrapped in successive radially outwardly disposed layers around a circular cutter assembly having a plurality of knives spaced around the cutter assembly with the knife edges facing radially outwardly and with the innermost layer of material positioned in contact with the knife edges. The improved method involves applying against and over an arcuate surface portion of the continuously forming outer layer of material pressure distributed over an arc eccentric to and of greater radius than the radius of the arcuate surface portion. The apparatus for practice of the method preferably involves the use of a pressure ring encircling the layers of material wrapped around the cutter assembly and having a greater diameter than the wrapped layers, and eccentrically displacing the pressure ring relative to the cutter assembly.

16 Claims, 9 Drawing Figures

PATENTED JUL 30 1974
3,826,163
SHEET 5 OF 6

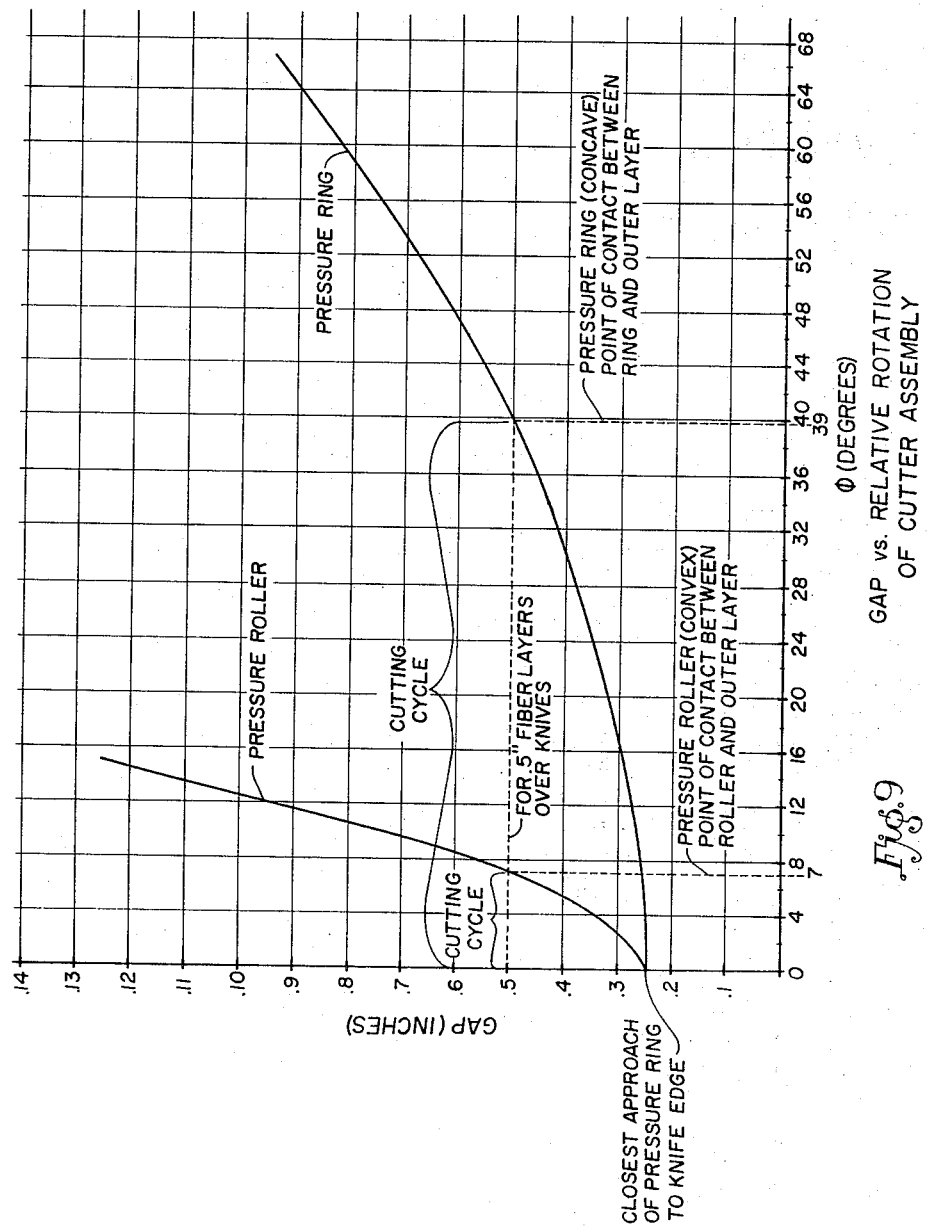

METHOD FOR APPLYING PRESSURE IN CUTTING ELONGATED FLEXIBLE MATERIAL INTO PREDETERMINED SHORTER LENGTHS, AND APPARATUS FOR PRACTICING THE IMPROVED METHOD

BACKGROUND OF THE INVENTION

This invention relates to the methods and apparatus disclosed in the Keith U.S. Pat. No. 3,485,120 and the Coffin et al. U.S. Pat. No. 3,557,648 for cutting elongated flexible material into predetermined shorter lengths, such as cutting continuous length filamentary material or tow into staple fibers into desired lengths, and is directed to an improved method for applying pressure in cutting such elongated flexible material and to apparatus for practicing the improved method.

As recognized by the two patents mentioned above, there are many known types of cutting devices and methods for dividing elongated material into short lengths. Some of these perform satisfactorily at lower speeds but when run at high production rates, especially in cutting polyester or other man-made fiber tow, certain inherent faults develop.

For instance, in many of the prior art devices there occurs at some time during the cutting cycle a movement of the cutting surface longitudinally of the fiber. This longitudinal movement, although of short duration, occurs with great impact and at very high rates of speed. When this happens in the instance of cutting polyester or other man-made material, knife edges are dulled thereby causing friction which generates higher than usual amounts of heat. This heat is often sufficient to fuse the ends of adjacent fibers together. Dulling of the knife edges results in frequent shutdown times for machine maintenance involved in changing knives.

For example, in the use of one well-known device in the textile field comprising two slotted, contacting rubber rollers and a rotating assembly of knives synchronized to cut fibers, blade life was generally about 27 minutes when cutting polyester fiber tow having approximately 450,000 total denier.

The Keith and Coffin et al. patents disclose solutions for the problems mentioned above as well as some other problems that are discussed in the patents. The solutions involve methods, and apparatus for practicing the methods, by which the elongated flexible material is continuously wrapped around a reel-like member, which member is formed by a plurality of knife blades with their cutting edges facing radially outwardly and spaced apart a distance substantially equal to the lengths to be cut. The material is wrapped around the reel-like member with each successive layer being formed radially outwardly of the inner layer and the innermost layer being positioned in touch contact with the knife edges.

The pressure applying device disclosed in the patents is a roller adjustably mounted adjacent the reel-like member and the wrapped layers of tow. The roller applies pressure against the outer layer of tow, and this pressure is transmitted inwardly toward the knife edge directly opposite the roller to force the innermost layer in contact with the knife edge inwardly of or past the knife edge in a severing or cutting action. The pressure applying roller never contacts any of the knife edges because there is always a layer or more of material between the pressure applying roller and the knife edges.

The Keith and Coffin et al. patents thus disclose fiber cutting apparatus simple to operate, requiring relatively little power to drive even for tow in excess of one million denier and relatively inexpensive to build and maintain by comparison to many other fiber cutting devices in the prior art. The apparatus will operate at unusually high rates of production without significant blade wear for extended periods of time. Excessive heat generation which can cause fused fibers during the cutting process is avoided, and staple fibers are cut in accurate, substantially uniform lengths. Although the apparatus disclosed in the patents is primarily useful in cutting filamentary material, the apparatus can also be used to cut films, tapes, wires or strips of nearly any material possessing sufficient flexibility to be wound in the manner disclosed.

As is often true of many devices, apparatus, and processes or methods, improvements can always be made to such to make the performance still more effective. The fiber cutting apparatus disclosed in the Keith and Coffin et al. patents represents a significant advance over the prior art as to receive notable industry acceptance. The annual savings in knife replacements alone has been by at least a factor of 10. Other problems that had prevailed for so long a time in cutting the new man-made continuous length materials have been, in many instances and for the most part, eliminated or greatly minimized. Thus, it was awhile before attention was directed to the new cutting apparatus to see if it could be made to perform still more effectively.

It has been noted that the engagement of the pressure roller against the continually forming outer layer causes the material wrapped around the cutter head to form a roll or be pushed up before the nip or pinch point of the pressure roller. Lateral pressure is thus transmitted inwardly of the wrapped layers to the knives immediately adjacent to and before the nip or point of closest approach of the pressure roller to the cutter head. This lateral pressure produces a side thrust creating some shifting of the tow or material in the layers which are not directly in contact with the knife edges. It also tends to twist or roll-over the tip of the knife with the consequence that only a portion of the total load is effective for cutting.

To explain this in another manner, at some point the pressure roller begins to apply force to the knife through the two layers. This occurs when the gap between the pressure roller and knife is essentially equal to the thickness of the tow layers. When sufficient force or threshold force builds up, then cutting is initiated. Cutting continues until the force reduces below the threshold cutting level or force. The line of force from the pressure roller through the tow layers to the knife where threshold cutting occurs is at some angle that produces a combined radial and side thrust rather than direct or radial thrust with respect to the knife. As mentioned above, this side thrust tends to create some shifting of the tow layers, except for the layer in knife edge contact, and tends to twist or roll over the tip of the knife, thus tending in time to dull the knife edge. Therefore, only a portion of the total load is effective in cutting, i.e., only the radial portion of force generated between the pressure roller and the knife is effective in cutting. The lateral or tangential portion is of no value in cutting, and hinders the operation by causing such shifting of the tow or rolling of the tow ahead of the pressure roller as it bears against the tow layers.

The object of the present invention is to provide a method and apparatus for practice of the method by which the cutting force is concentrated more radially and less tangentially or laterally.

Dependent upon the length of fiber cut, it has been noted that at times there is a tendency for the cut fiber to rebound from between the chamber formed between adjacent knives, as pressure applied by the pressure roller is transmitted toward the next adjacent chamber. Crimped fibers are quite elastic and spring-like. If, for whatever reason, there should be some blockage in the chamber by previously cut fiber in exiting from the chamber toward the central portion of the cutter head assembly for subsequent removal to a fiber baling apparatus, an apparent counter pressure appears to result causing some of the cut fiber to move radially outwardly of the chamber and to shift slightly in the direction of the lateral thrust. The consequence of this result is that upon the next revolution when cutting pressure again is applied in that particular area, a minute portion of the previously cut fiber has shifted to the adjacent chamber and is then recut. The recut portion is quite minute, being on the order of about 10 diameters of the fiber in length, and in time all such recut portions cumulatively add to the dust and lint problem. Another result is that the major portion of the particular fiber or fibers remaining after they have been recut is not of uniform length as the normal single cut fibers. It is not an overly significant problem, but it is present under certain conditions.

Another object of the invention is to apply cutting pressure that will extend through a longer period of time sufficient to enable the severed fiber to flow through the chamber, as defined by adjacent knives, for subsequent discharge from the cutter head or cutter assembly without rebound of any of the severed fibers.

As the distance between adjacent knives is increased to cut longer staple fibers, the knife edges tend to define more of a polygon and less of a smooth, curved continuous surface. The pressure applied by the pressure roller therefore tends in effect to approach the wrapped tow layers rather suddenly causing an impact or thump, and the cumulative result of all the impacts is vibration. In other words, the pressure roller presents to the tow layers at any one moment or over any one portion a convex arc. The wrapped layers of tow also present to the pressure roller at any one moment or over any one portion a convex arc. The closest approach of each to the other is, of course, along a line extending through the respective centers of the cutter assembly with its continually forming tow wraps and the pressure roller. The closest approach of either then is the point of rolling contact between the two. As the distance between adjacent knives is increased to obtain a longer cut fiber, the pressure roller, which is of smaller diameter than the diameter of the cutter head assembly including its tow wraps, tends in effect to "drop" into each chamber thereby creating the impact mentioned above and the resultant vibration.

Although this problem might be somewhat minimized by changing to pressure rollers having greater and still greater diameters as the distance between adjacent knives is increased, there is still a rolling contact point between two opposing convex arcs, at any one moment or along any one portion. It would not provide a satisfactory solution to the problem and would be impractical because it would increase the size of the apparatus in the fiber operating area.

Still another object of the invention, therefore, is to reduce the suddenness of the applied pressure and hence the cutting action by extending or sustaining the applied pressure over a longer period of time at a lower total force level, thereby reducing impact and hence reducing vibration.

SUMMARY OF THE INVENTION

The present invention is directed to an improved method for applying pressure in cutting elongated flexible material in the manner by which cutting occurs in the Keith U.S. Pat. No. 3,485,120 and the Coffin et al. U.S. Pat. No. 3,557,648, and to apparatus for practicing the method. The elongated flexible material is continuously wrapped in successive radially outwardly disposed layers around a circular cutter assembly having a plurality of knives spaced around the cutter assembly with their edges facing radially outwardly and with the innermost layer of material positioned in contact with the knife edges, all in the manner taught by the Keith and Coffin et al. patents. The improved method involves applying against and over an arcuate surface portion of the continuously forming outer layer of material pressure distributed over an arc eccentric to and of greater radius than the radius of the arcuate surface portion. The continuously forming innermost layer of material is cut into predetermined lengths radially inwardly of the applied pressure by being movingly pressed inwardly of the knife edges. The apparatus for practicing the method comprises the circular cutting assembly and a pressure applying arrangement including a concave surface adapted to engage an arcuate surface portion of the continuously forming outer layer of material wrapped around the cutter assembly, the concave surface being eccentric to and of greater radius than the radius of the arcuate surface portion and adapted to be continuously movable with respect to the cutter assembly.

The concave surface is preferably provided by the interior surface of a circular hoop or annulus or pressure ring that is freely movable with respect to the cutter assembly. The pressure ring or hoop is simple in construction, has no moving parts and is simply applied. The pressure ring has an inside diameter slightly greater than the diameter of the circular knife edges around which the elongated flexible material is wrapped, and is eccentrically displaced with respect to the cutter assembly to bear against a portion of the continuously forming outer layer of material by a pressure roller means, such as by an individual pressure roller that is adjustably movable toward and away from the cutter assembly. The pressure roller means may also take other forms such as a series of cam followers mounted on a locating ring encircling the pressure ring or hoop, the locating ring being secured to a supporting frame and provided with an eccentric adjustment.

In the embodiment of the apparatus principally shown in the above referred to Keith patent, the cutter assembly is driven in rotation with the elongated flexible material, such as crimped filamentary tow, being wrapped in layers as the cutter assembly rotates. The disclosed pressure roller remains to one side of the cutter assembly, is adjustable toward and away from the cutter assembly, and rotates in its adjusted position by frictional engagement with the continuously forming outer layer of material wrapped around the cutter assembly. The number of wrapped layers formed prior to any cutting action occurring is determined by the adjusted position of the pressure roller and the amount of tension on the wraps.

In this embodiment, therefore, the practice of the improved pressure applying method results in the pressure ring being eccentrically displaced or positioned by the pressure roller to one side of the cutter assembly and being caused to roate in place in its eccentric position by frictional engagement with the continuously forming outer layer as th cutter assembly rotates.

The pressure roller bears against the pressure ring and thus assures continued frictional engagement of the inside surface of the pressure ring with the continuously forming outer layer. Although the wraps of material beyond the area of frictional engagement rotate relative to the pressure ring, due to the difference in the respective diameters of the outer layer and the pressure ring there is substantially no relative movement between the outermost wrapped layer and the pressure ring in the area of the frictional engagement. The pressure ring is thus caused to rotate at essentially the same speed as the speed of rotative movement of the outermost wrapped layer in the area of such frictional engagement.

In cutting elongated flexible material such as crimped filamentary tow used for textile purposes, the outermost layer is tensioned to an extent sufficient so as to straighten out the crimp in the filaments of the tow without permanently removing the crimp. As the layers of tow are moved radially inwardly and hence forced into spirals of smaller circumferences, there is a relaxation of tension of the innermost layers so that the crimp in the filaments has recovered to a desired predetermined extent prior to actual cutting. This is done in the manner taught by the Keith patent in order to control the length of crimped fibers cut.

In the embodiment of the apparatus principally shown in the above referred to Coffin et al. patent, the cutter assembly is stationary, and the guiding arrangement for guiding the elongated flexible material to the cutter assembly is rotated or moved bodily around the stationary cutter assembly to wrap the material around the cutter assembly in layers. The disclosed pressure roller, also adjustable toward and away from the cutter assembly, is rotated or moved bodily around the cutter assembly along with the material guiding arrangement. The pressure roller rotates as it is moved around the cutter assembly by frictional engagement with the continuously forming outer layer of material wrapped around the cutter assembly.

In this second embodiment, therefore, the practice of the improved pressure applying method results in the freely movable pressure ring being eccentrically displaced or positioned by the pressure roller to one side of the cutter assembly and thereafter being caused to be moved bodily around the cutter assembly by being continuously eccentrically displaced by the pressure roller as the pressure roller is moved around the cutter assembly. The pressure ring also rotates as it is moved around the cutter assembly by frictional engagement with the continuously forming outer layer as the layers are formed by the moving guiding arrangement.

In both embodiments, the pressure ring applies a pressure that builds up gradually until cutting of the innermost layer of material is initiated, which occurs at about the beginning of the arc of contact, by the innermost layer being moved inwardly of the knife edges. The greatest amount of pressure and hence the greatest amount of cutting occurs at the closest approach of the inside surface of the pressure ring to a knife edge. The cutting, however, occurs over a wide arcuate position as compared to the prior art use only of a pressure roller where cutting occurs only radially inwardly of the nip or point of rolling contact by the pressure roller with the continuously forming outer layer of wrapped material.

In other words, in the prior art the pressure roller presents a convex surface to the convex surface portion of the continuously forming outer layer of material on the cutter assembly and thus distributing pressure mostly at the point of rolling contact; whereas in the present invention the pressure ring presents a concave surface to the convex surface portion of the outer layer of material, thus distributing pressure over an arcuate area.

Stated still in another manner, the concave or inside surface of the hoop or pressure ring, as it is engaged against and over an arcuate surface portion of the continuously forming outer layer of material, defines between the pressure ring inside surface and the outer layer of material a crescent-shaped opening. The elongated flexible material is fed to the cutter assembly for wrapping therearound into the widest portion of the defined crescent-shaped opening and cutting of the innermost layer of wrapped material occurs radially inwardly of the crescent-shaped opening between the points or horns of the crescent.

Since the pressure is being applied over an arcuate surface portion of the continuously forming outer layer of wrapped material, the pressure is sustained over a longer period of time than in comparison with the prior art use only of a pressure roller with its nip contact. Thus the sustaining pressure allows more time for the predetermined cut lengths to escape radially inwardly of the chambers formed by adjacent knives and thereby prevents any spring-back of the cut material and possible recutting of a portion of the previously cut lengths of material.

BRIEF DESCRIPTION OF THE DRAWINGS

In the drawings:

FIG. 9 is a graph showing a comparison of the cutting cycles between the cutting apparatus of the prior art and the cutting apparatus of the present invention.

DESCRIPTION OF THE PREFERRED EMBODIMENT a. Prior Art

Figure 1:
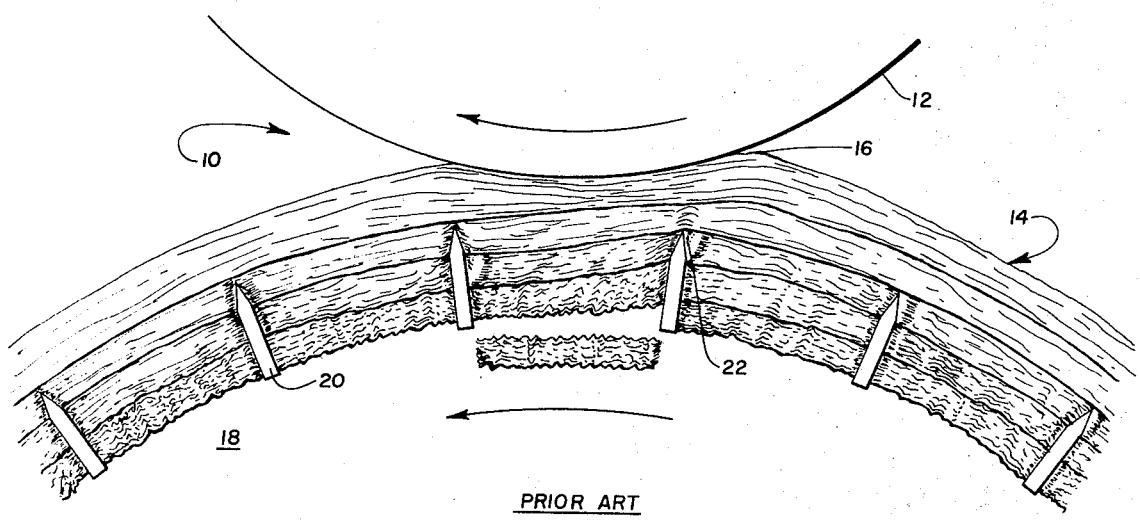
FIG. 1 is a plan view of portions of a cutter assembly and a pressure roller with layers of material wrapped around the cutter assembly showing cutting occurring under some circumstances in the prior art, and illustrating the pushed up material that forms adjacent to the pressure roller and the spring-back of some of the previously cut lengths of material with re-cutting occurring of a portion of such previously cut lengths.

FIG. 1 graphically illustrates the problem mentioned with respect to the cutting apparatus disclosed in the Keith and Coffin et al. patents. Only a portion of the cutting apparatus 10 is shown. The pressure roller 12, as it bears against the continuously forming outer layer of the elongated flexible material 14, causes the material to be pushed up or rolled, as shown at 16, adjacent the pressure roller, as either the cutter assembly 18 moves relative to the pressure roller or the pressure roller moves relative to the cutter assembly. The pushed up material also extends radially inwardly to a certain extent, dependent upon the number of layers wrapped around the cutter assembly, tension on the layers and the like. The pushed up material causes a side thrust to be transmitted inwardly of the layers toward the knives, as previously mentioned.

In cutting crimped filamentary tow into staple fibers the crimped fibers act like springs. Since the pressure roller is only in position momentarily opposite any one cutting chamber, the cutting chamber being formed by any two adjacent knives, the severed crimped staple fibers sometimes spring back from the chamber once the pressure applied by the pressure roller is relieved by the roller becoming in alignment with the next chamber. The outlet from a cutting chamber becomes blocked by other severed fibers and the pressure applied by the pressure roller is not sustained long enough before the severed fibers have a chance to escape from the chamber through the outlet. Upon the next revolution the side thrust by the pushed up material causes a slight shifting of the previously cut fiber that has sprung back with the result that an end portion of the cut fiber extends over into the next chamber and that end portion, designated at 22, is cut along with the normal length fibers. The severed end portion eventually is pushed through the chamber as lint or fly and is collected along with the normally cut lengths of crimped staple fibers. This lint or fly creates dust problems in the processing equipment.

As also previously mentioned, the pressure roller tends to approach the chamber rather suddenly and is sustained for a relatively short time. As the spacing between knives is increased, the suddenness becomes more pronounced as a jolt or bump that in the aggregate creates vibration.

As further previously mentioned, the side or lateral thrust that is created is of no value in cutting since only the radial portion of force generated between the pressure roller and the knife is effective in cutting. The side thrust also tends to twist or roll over the tip of the knife, eventually reducing its effective cutting life.

b. Present Invention

Figure 2:
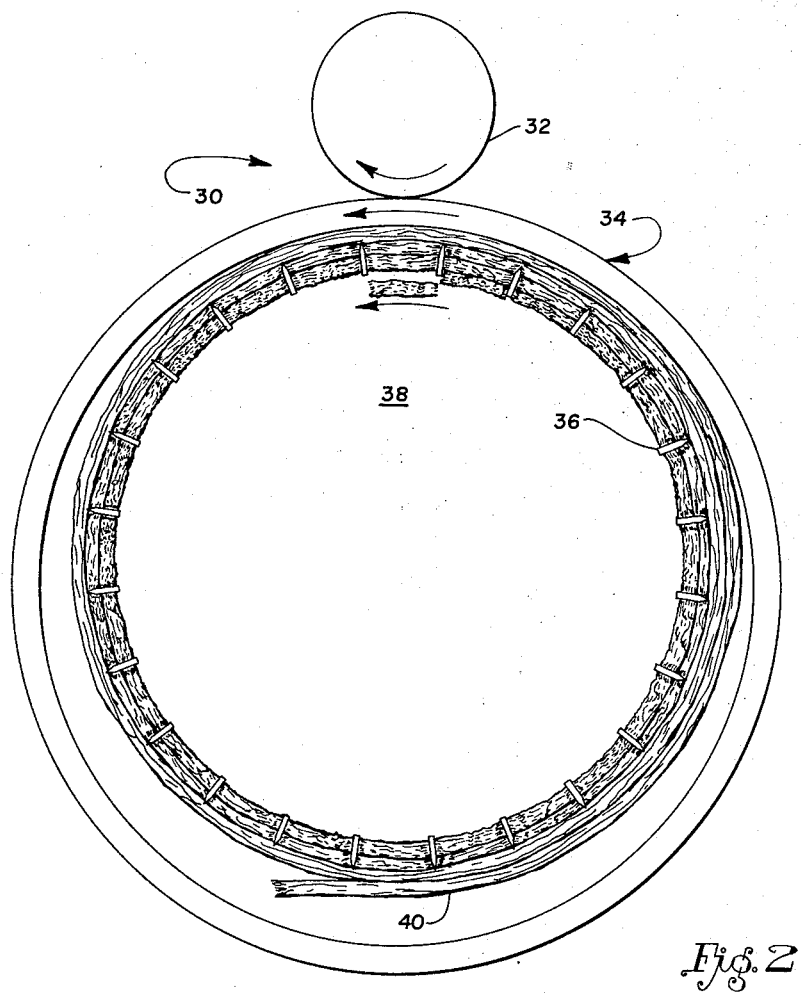
FIG. 2 is a plan view of a graphic illustration of a rotating cutter assembly with material being wrapped therearound, the pressure ring encompassing the cutter assembly and its wraps of material and the pressure roller bearing against and eccentrically displacing the pressure ring to a position at one side of the cutter assembly.
Figure 3:
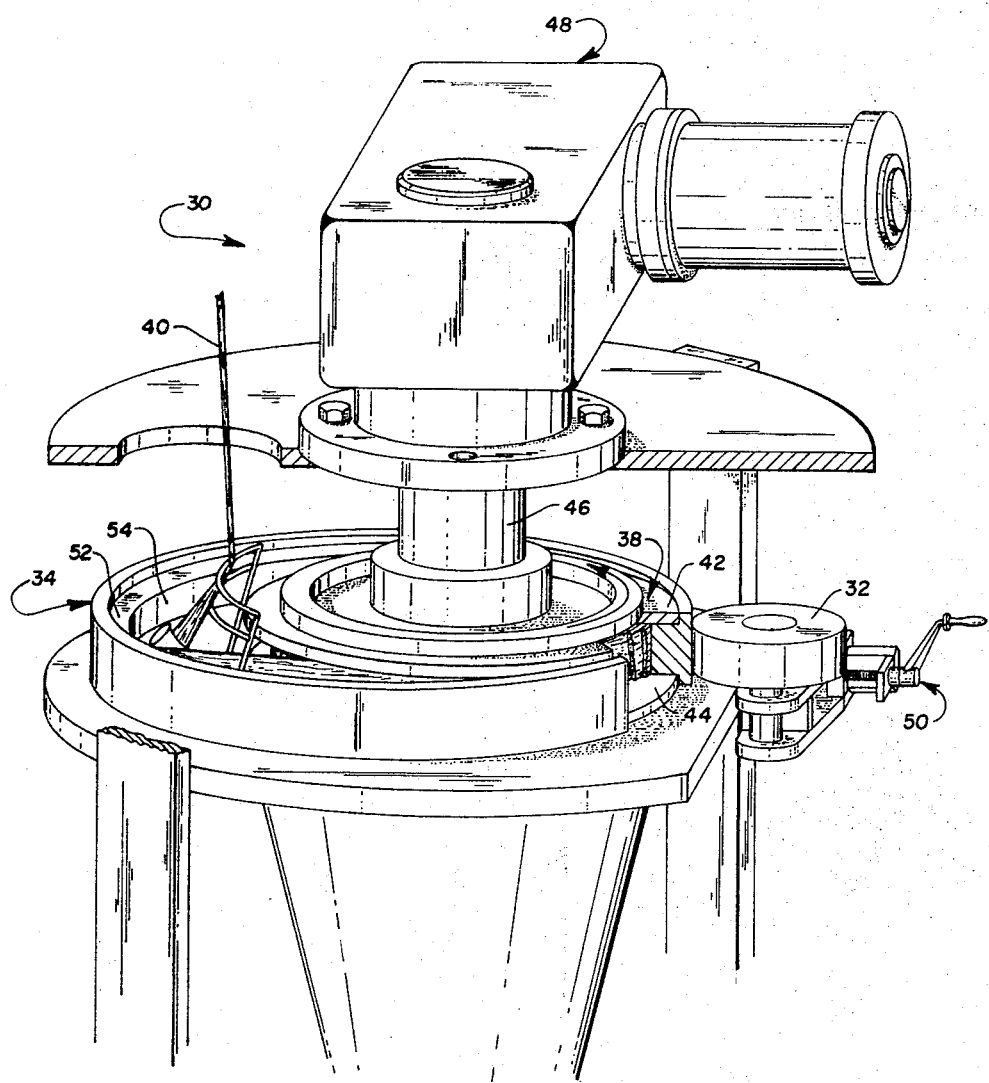
FIG. 3 is an isometric view of the cutting apparatus that is graphically illustrated in FIG. 2.

In reference to FIGS. 2 and 3, 30 designates a cutting apparatus for practice of the improved pressure applying method. The pressure roller 32 adjustably bears against a hoop or pressure ring 34, which is of slightly greater diameter than the diameter defined by the edges of the knives 36 on the cutter assembly 38. The elongated flexible material 40 is continuously wrapped in layers around the cutter assembly with the continuously forming innermost layer being positioned in contact with the edges of the knives 36.

The cutter assembly 38 comprises the knives 36 and a mounting member for the knives, the mounting member including an upper disk 42 and a lower mounting ring 44, suitably spaced apart in parallel relation from the upper disk. The cutter assembly is removably connected to a drive shaft 46 so that the cutter assembly may be driven in rotation. The drive shaft is suitably connected to a drive unit indicated in general at 48.

The pressure roller 32 may be adjusted toward and away from the cutter assembly by the adjusting arrangement shown in general at 50.

The Keith U.S. Pat. No. 3,485,120, may be referred to for a more detailed description of the manner in which the knives are mounted, and the operation of the other components of the cutting apparatus. The pressure ring 34 is essentially the only component that has been added to the Keith patented apparatus in the present invention, but as added makes a significant difference in the manner by which pressure is applied in cutting the continuously forming inner layer of material.

The pressure ring 34 preferably is provided with an inner shoulder portion 52 which interfits to ride between the upper disk 42 and the lower mounting ring 44. The disk and the lower mounting ring extend beyond the knife edges to form an area in which the wrapped material is retained in position around the cutter assembly in successive layers radially outwardly of each other. The pressure ring is thus held in position around the cutter assembly by its interfitting inner shoulder portion and by the pressure roller adjustably bearing against the outside surface of the pressure ring. The pressure ring is otherwise freely movable with respect to the cutter assembly. The inner shoulder portion 52 is of sufficient depth to allow some latitude in adjustment of the pressure roller and thereby adjustment of the number of layers that may be wrapped around the cutter assembly before any cutting commences. The inside surface 54 of the inner shoulder portion is the surface which comes into engagement with and bears against the continuously forming outer layer.

In operation of the cutting apparatus 30, the incoming elongated flexible material 40 is fed into the rotating cutter assembly 38 and is wrapped in layers around the cutter assembly between the upper disk 42 and the lower mounting ring 44. The innermost layer of material is positioned in contact with the knife edges and the successive layers are positioned radially outwardly of each other until the distance between the knife edges and the pressure ring 34, in its arcuate area of contact with the outer layer, is filled.

The pressure ring is, in effect, wedged eccentrically to one side of the cutter assembly by and between the pressure roller 32 and the layers of material continuously wrapping around the cutter assembly. The inside surface 54 of the pressure ring thus presents a concave surface that is eccentric to and of greater radius than the radius of the arcuate surface portion presented by the continuously forming outer layer of material wrapped around the cutter assembly.

Since the pressure ring 34 is freely movable, the rotating cutter assembly serves through frictional engagement with the pressure ring with the layers of material wrapped around it to drive the pressure ring in rotation. As a particular portion of the continuously forming outer layer, as moved in rotation by and with the rotating cutter assembly, is brought into engagement with the pressure ring, the ring and the particular portion travel together at substantially the same speed or with substantially no relative motion occurring therebetween during the time of engagement.

The pressure applied by the pressure ring to the layers of material gradually increases to the maximum predetermined amount at the point of closest approach of the pressure ring to the cutter assembly, followed by a gradual decreasing of pressure until the particular portion is moved out of engagement with the pressure ring.

Since the greatest amount of cutting occurs at the point of closest approach of the pressure ring to the cutter assembly, there is less material thickness between the pressure ring and the cutter assembly in the area of arcuate engagement following the point of closest approach. Thus the pressure applied falls off slightly faster over the area of arcuate engagement following such point of closest approach.

The pressure is transmitted radially inwardly of and through the wrapped layers to the innermost layer of material positioned against the knife edges with consequent cutting of the innermost layer occurring by it being forced inwardly of or past the knife edges.

The cutting action is continuous as portion by portion of the continuously forming outer layer is brought into wedging engagement with the pressure ring. The pressure applied by the pressure ring is sustained over a wide arcuate area as compared to the prior art use of a pressure roller the convex surface of which curves immediately away from the outer layer of material following the point of its closest approach or rolling contact with the outer layer.

As may be observed from FIGS. 2 and 3, the elongated material is fed to the cutter assembly between the pressure ring and the continuously forming layers in the area of greatest distance of the ring from the layers, or approximately diametrically opposed from the point of closest approach of the pressure ring to the layers.

Figure 4:
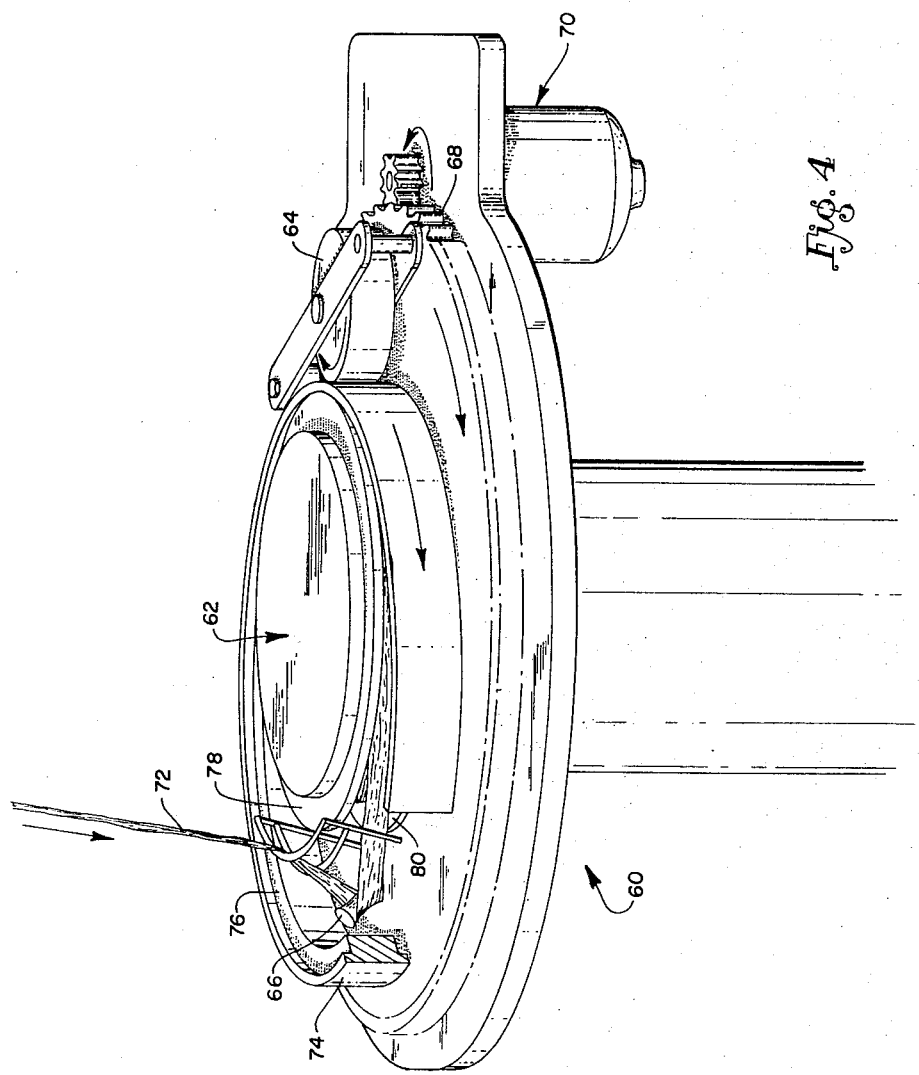
FIG. 4 is an isometric view of another embodiment of apparatus wherein the cutter assembly is stationary and the pressure roller and material guiding arrangement move bodily around the cutter assembly with the pressure roller continuously eccentrically displacing the pressure ring to a side of the cutter assembly as the pressure roller is moved around the cutter assembly.

In reference to FIG. 4, 60 designates a cutting apparatus, which operates in the manner disclosed in the above referred to Coffin et al. U.S. Pat. No. 3,557,648. In this second embodiment, the cutter assembly 62 is stationary, while the pressure roller 64 and the material guiding arrangement 66 are driven in rotation around the stationary cutter assembly by the ring gear 68 to which the pressure roller and material guiding arrangement are operatively connected and by the drive unit 70. The elongated flexible material 72 is thus wrapped in layers around the cutter assembly, in the manner disclosed in the Coffin et al. patent, with the continuously forming innermost layer being positioned in contact with the edges of the knives (not shown). The pressure roller 64 is adjustably movable toward and away from the cutter assembly by a suitable adjusting arrangement (not shown).

The Coffin et al. patent may be referred to for details of the various components and general principles of operation. As true of the first embodiment discussed above with respect to FIGS. 2 and 3, the pressure ring 74 is essentially the only component that has been added to the Coffin et al. patented apparatus in the present invention, but as added makes a significant difference in the manner by which pressure is applied in cutting the continuously forming inner layer of material.

The pressure ring 74 may also be provided with an inner shoulder portion 76 which interfits to ride between the upper disk 78 and the lower mounting ring 80 which support the knives (not shown) in spaced relation therebetween and around the cutter assembly. The interfit of the pressure ring with the cutter assembly is the same as that described with respect to the embodiment of FIGS. 2 and 3.

In operation of the cutting apparatus 60, the incoming elongated flexible material 72 is fed to the stationary cutter assembly and is wrapped in layers therearound by the rotating material guiding arrangement 66.

The pressure ring 74, is in effect, wedged eccentrically to one side of the cutter assembly by and between the pressure roller 64 and the layers of material continuously building up or wrapping around the cutter assembly.

In this second embodiment it is the pressure roller, as it is moved bodily around the cutter assembly, that serves as the driving member for the freely movable pressure ring. As the pressure roller bears against and eccentrically displaces the pressure ring to one side of the cutter assembly against the continuously building layers of material, the pressure roller moves the pressure ring bodily around the cutter assembly by continuously eccentrically displacing the pressure ring. The pressure ring thus moves into engagement with successive arcuate portions of the continuously forming outer layer of wrapped material with essentially no relative movement occurring between the surface of the pressure ring that is in contact at any moment with the arcuate portion of the outer layer of material.

The application of pressure by the pressure ring is the same as that described with respect to the first embodiment of FIGS. 2 and 3.

Figure 5:
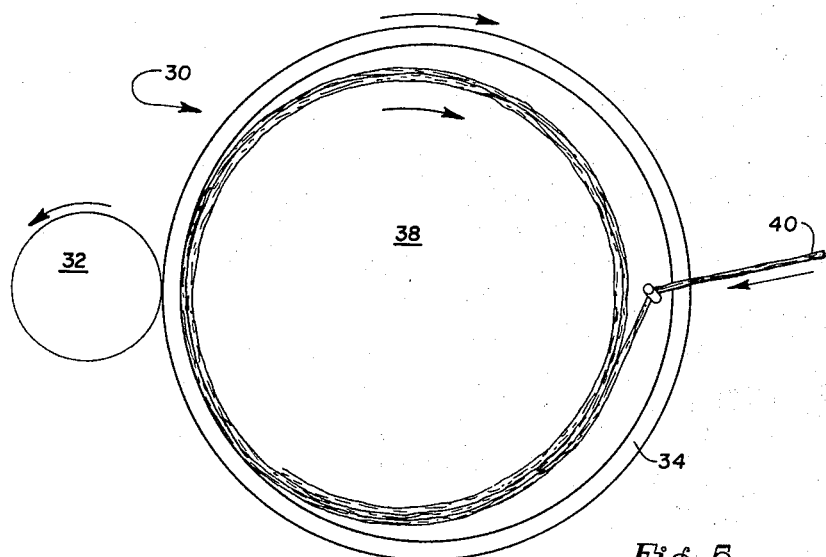
FIG. 5 is a graphic illustration of the first mentioned embodiment showing the relative directions of movement occurring in the pressure roller, pressure ring, cutting assembly (illustrated without the knives), and the material as it is wrapped around the cutter assembly.
Figure 6:
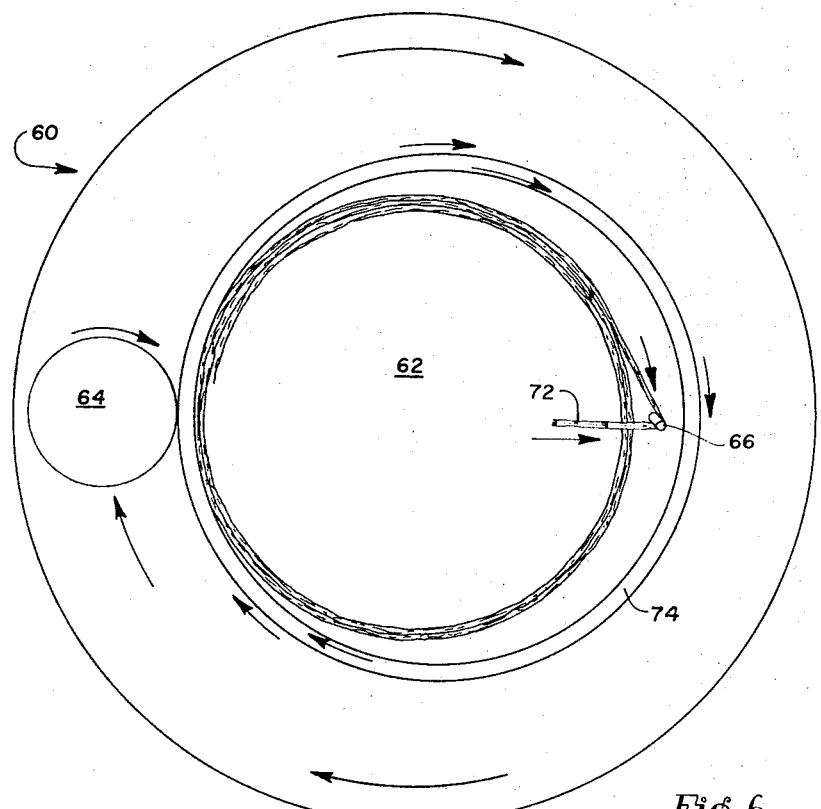
FIG. 6 is a graphic illustration of the second mentioned embodiment, also showing the relative directions of movement occurring in the pressure roller with respect to the stationary cutting assembly (also without illustrating the knives), the pressure ring, the material guide arrangement and the material as it is wrapped around the cutter assembly.

In reference now to FIGS. 5 and 6, FIG. 5 graphically illustrates the different rotative motions taking place in the first embodiment of FIGS. 2 and 3, while FIG. 6 graphically illustrates the different rotative motions taking place in the second embodiment of FIG. 4. The reference numbers shown are the same as those used in the description of the two different embodiments.

In FIG. 5, the elongated flexible material 40 feeds onto the cutter assembly which is shown as rotating clockwise. The pressure roller 32, by its rolling frictional engagement with the pressure ring 34, is shown as rotating counterclockwise. The pressure ring rotates in place clockwise by it being wedged against the continuously forming layers of material, which in turn rotate clockwise with the cutter assembly.

In FIG. 6, the elongated flexible material 72 feeds onto the cutter assembly 62 and is wrapped therearound by the material guiding arrangement 66, which is shown as rotating clockwise. The pressure roller 64 is shown as rotating clockwise by its frictional rolling engagement with the pressure ring 74 while at the same time bodily moving in a clockwise direction around the cutter assembly 62. The pressure ring 74 is shown as rotating clockwise while at the same time bodily being moved by the pressure roller in a clockwise direction around the cutter assembly.

In both FIGS. 5 and 6, the pressure ring defines with the continuously forming outer layer of material an opening of crescent-shaped configuration between the inside surface of the pressure ring and the outer surface of the continuously forming outer layer. Cutting of the inner layer of material commences at about the area between the points or horns of the crescent-shaped opening. The area between the points or horns of the crescent-shaped opening is the approximate area of arcuate engagement by the pressure ring with the continuously forming outer layer of material being wrapped around the cutter assembly.

Figure 7:
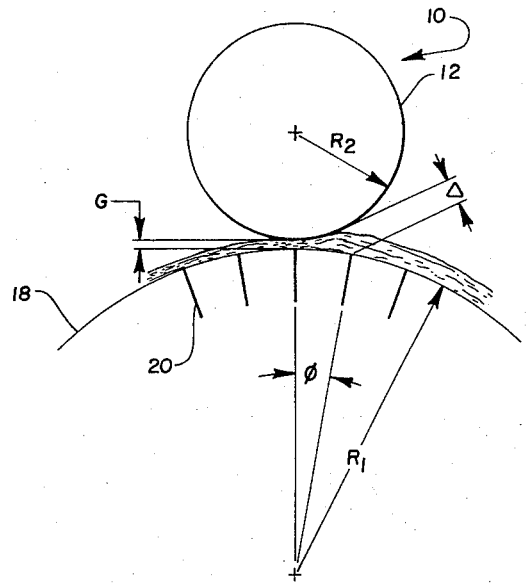
FIG. 7 is a plan view of a graphic illustration of a pressure roller and the cutter assembly of the prior art showing the distance or gap between the knife edges and the pressure roller.
Figure 8:
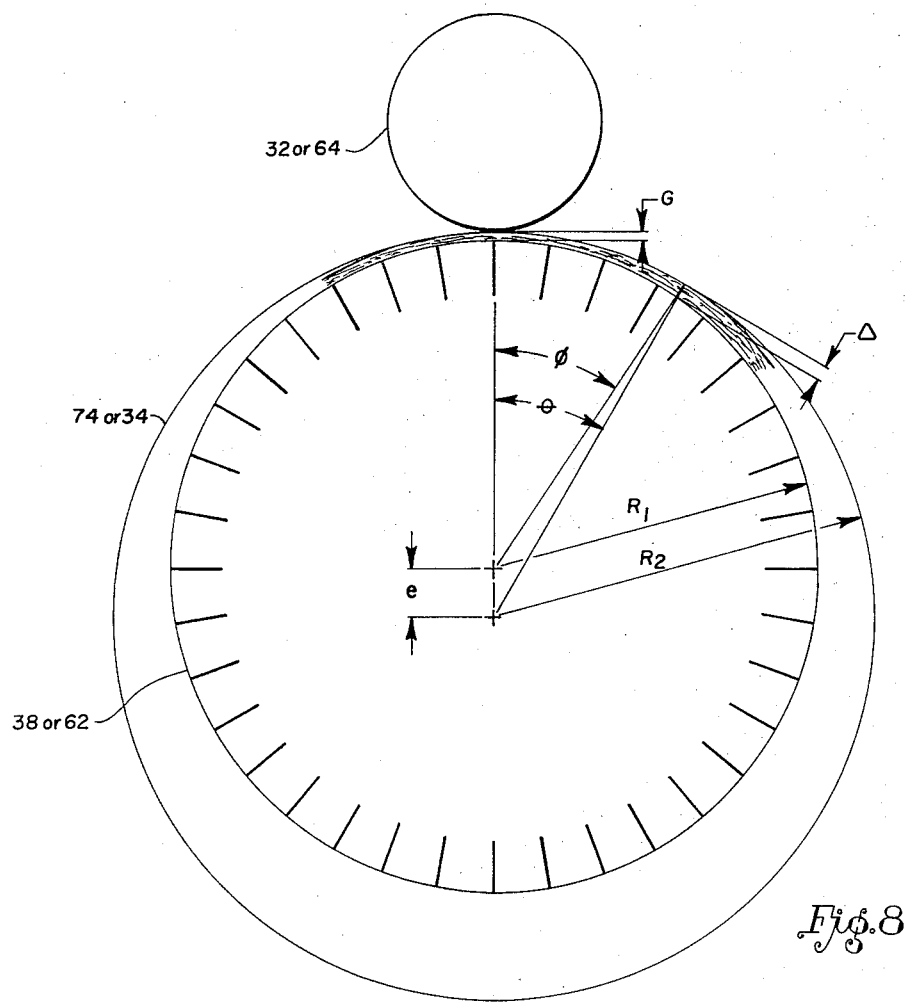
FIG. 8 is a plan view of a graphic illustration of a pressure ring and the cutter assembly of the invention showing the distance or gap between the knife edges and the pressure ring.

In reference now to FIGS. 7, 8 and 9, these figures illustrate the comparison between the cutting apparatus operating in the manner disclosed in the prior art Keith and Coffin et al. patents and the manner in which the cutting apparatus of the present invention operates.

In FIG. 7, which shows the cutting apparatus 10 of the prior art, $\Delta$ represents the distance or gap between the pressure roller 12 and the knife edge. $\Delta$ is calculated over an arc extending from the point of first contact made by the pressure roller with the continuously forming outer layer of material to the point of closest approach between the pressure roller and the edges of the knives 20. The pressure applied by the pressure roller increases as this distance or gap decreases. The distance or gap decreases in accordance with the following equation:

$$\Delta = R_2 - \sqrt{(R_1 \sin \phi)^2 + [(R_1 + G + R_2) - R_1 \cos \phi]^2} \quad (1)$$

wherein
$R_1$ = radius defined by the knife edges;
$R_2$ = radius of the pressure roller;
$\phi$ = angle measured from the common line extending between the centers of the pressure roller and the cutting assembly and the line extending from the center of the cutter assembly and the knife edge lying within the arc over which $\Delta$ is calculated;
$G$ = gap at the point of closest approach.

In FIG. 8, which shows the cutting apparatus of the present invention, $\Delta$ represents the distance or gap between the pressure ring (34 or 74 of either embodiment) and the knife edge. $\Delta$ is calculated over an arc extending from the point of first contact made by the pressure ring with the continuously forming outer layer of material to the point of closest approach between the pressure ring and the edges of the knives. The pressure applied by the pressure ring increases as this distance or gap decreases, the distance or gap decreases in accordance with the following equation:

$$\Delta = \sqrt{(R_2 \sin \theta)^2 + (R_2 \cos \theta - e)^2} - R_1 \quad (2)$$

$\phi = \tan^{-1}(R_2 \sin \theta / R_2 \cos \theta - e)$
$G = (R_1 + e) - R_2$ wherein
$R_1$ = radius defined by the knife edges;
$R_2$ = inside radius of the pressure ring;
$e$ = distance between the respective centers of the cutter assembly and the pressure ring;
$\theta$ = angle measured from the point of first contact to the point of closest approach of the pressure ring to the knife edges relative to the center of the pressure ring;
$\phi$ = angle measured from the point of first contact to the point of closest approach of the pressure ring to the knife edges relative to the center of the cutter assembly.

To illustrate the significance of these equations (1) and (2), the following examples are given:

For the case of the prior art of FIG. 7 and using equation (1) and values of
$R_1$ = 9 inches
$R_2$ = 3 inches
$G$ = 0.25 inch
and wherein the thickness of the layers of material wrapped around the cutter assembly is one-half inch, the following values of $\Delta$ are calculated for the corresponding angles $\phi$:

| $\phi$ | $\Delta$ |
|---|---|
| 0° | .2500 inch |
| 2° | .2706 inch |
| 4° | .3316 inch |
| 6° | .4308 inch |
| 8° | .5649 inch |
| 10° | .7299 inch |
| 20° | 1.8847 inches |

For the case of the present invention of FIG. 8 and using equation (2) and values of
$R_1$ = 9 inches
$R_2$ = 10.5 inches
$G$ = 0.25 inch
and wherein the thickness of the layers of material wrapped around the cutter assembly is one-half inch, the following values of $\Delta$ and $\phi$ are calculated for the corresponding angles $\theta$:

| $\theta$ | $\Delta$ | $\phi$ |
|---|---|---|
| 60° | .94475 inch | 66.26° |
| 50° | .74086 inch | 55.64° |
| 40° | .57620 inch | 44.81° |
| 30° | .43810 inch | 33.80° |
| 20° | .3352 inch | 22.62° |
| 10° | .2715 inch | 11.34° |
| 0° | .2500 inch | 0° |

FIG. 9, therefore, is a graphic illustration wherein the two different pressure applying methods for the values calculated are compared. The graph demonstrates the gradual decrease in the gap and hence gradual build-up of pressure applied by the pressure ring of the present invention as compared to the rapid decrease in the gap and hence rapid build-up of pressure by the pressure roller of the prior art.

For the case of the prior art (FIG. 7), pressure build-up and subsequent cutting occurs through an angle of rotation of less than 7°; whereas in the present invention (FIG. 8) pressure build-up and subsequent cutting occurs through an angle of rotation of about 39°, as evident from the graph shown in FIG. 9.

As a result of this gradual cutting process for the present invention, the cutting action is substantially smooth and is substantially sustained or uninterrupted as compared to the rapid, interrupted thumping action of the prior art, particularly where the knife spacing is such that one knife passes the point of closest approach before the next knife begins to experience the pressure build-up applied by the pressure roller. In this manner, vibration is reduced.

Although the invention has been described in considerable detail with particular reference to certain preferred embodiments thereof, variations and modifications can be effected within the spirit and scope of the invention.

We claim:

1. The method of cutting elongated material into predetermined lengths comprising:
   continuously wrapping the elongated flexible material in successive radially outwardly disposed layers around a circular cutter assembly having a plurality of knives spaced around the cutter assembly with their edges facing radially outwardly and with the innermost layer of material positioned in contact with the knife edges;
   applying against and over an arcuate surface portion of the continuously forming outer layer pressure distributed over an arc eccentric to and of greater radius than said arcuate surface portion; and
   continuously cutting into said predetermined lengths and radially inwardly of the applied pressure the continuously forming innermost layer of material by movingly pressing the innermost layer inwardly of the knife edges.

2. The method of cutting elongated flexible material into predetermined lengths as defined in claim 1, and wherein the elongated flexible material is continuously wrapped around the cutter assembly by rotating the cutter assembly.

3. The method of cutting elongated flexible material into predetermined lengths as defined in claim 1, and wherein the elongated flexible material is continuously wrapped around a stationary assembly.

4. The method of cutting into predetermined lengths filamentary tow material comprised of filaments having crimps therein, and comprising:
   continuously wrapping the filamentary tow material in successive radially outwardly disposed layers around a circular cutter assembly having a plurality of knives spaced around the cutter assembly with their knife edges facing radially outwardly and with the innermost layer of material positioned in contact with the knife edges;
   tensioning the outermost continuously forming layer to an extent sufficient so as to straighten out the crimp in the filaments of the tow without permanently removing the crimp and moving the layers that are inwardly of the outermost layer toward the knife edges to thereby relax the tension on the innermost layers of material so that the crimp in the filaments of the innermost layers recover to a desired predetermined extent;
   applying against and over an arcuate surface portion of the continuously forming outermost layer pressure distributed over an arc eccentric to and of greater radius than said arcuate surface portion; and
   continuously cutting into said predetermined lengths and radially inwardly of the applied pressure the continuously forming innermost layer of material by movingly pressing the innermost layer inwardly of the knife edges.

5. The method of cutting elongated flexible material into predetermined lengths as defined in claim 3, and wherein the applied pressure is moved around the stationary cutter assembly.

6. The method of cutting elongated flexible material into predetermined lengths as defined in claim 2, and wherein the applied pressure is retained in one position with respect to the cutter assembly as the cutter assembly rotates.

7. Apparatus for cutting elongated flexible material into predetermined lengths and comprising:
   a cutting assembly having a plurality of knives spaced around the cutter assembly with their edges facing radially outwardly;
   means for continuously wrapping the flexible material in successive radially outwardly disposed layers around the cutter assembly with the innermost layer of material positioned in contact with the knife edges; and
   means for applying against and over an arcuate surface portion of the continuously forming outer layer pressure distributed over an arc eccentric to and of greater radius than said arcuate surface portion whereby radially inwardly of the applied pressure said innermost layer of material is moved inwardly of the knife edges by the pressure and cut into said predetermined lengths.

8. Apparatus for cutting elongated flexible material into predetermined lengths as defined in claim 7, and including means for rotating the cutter assembly so as to continuously wrap the flexible material around the cutter assembly.

9. Apparatus for cutting elongated flexible material into predetermined lengths as defined in claim 7, and wherein the cutter assembly is stationary and means is provided for wrapping the flexible material around the cutter assembly.

10. Apparatus for cutting elongated flexible material into predetermined lengths as defined in claim 7, and wherein said means for applying pressure includes a member having a concave surface adapted to engage said arcuate surface portion of the continuously forming outer layer of material.

11. Apparatus for cutting elongated flexible material into predetermined lengths as defined in claim 10, and wherein said concave surface is relatively moveable with respect to the cutter assembly.

12. Apparatus for cutting elongated flexible material into predetermined lengths as defined in claim 7, and wherein said means for applying pressure comprises a pressure ring having a diameter greater than the diameter of the radially outwardly facing knife edges and being positioned in encompassing relationship around the cutter assembly in alignment with the knife edges, and pressure roller means positioned radially outwardly of the pressure ring and adapted to bear against and eccentrically displace the pressure ring with respect to the cutter assembly.

13. Apparatus for cutting elongated flexible material into predetermined lengths as defined in claim 12, and wherein said pressure roller means is adjustable toward and away from the cutter assembly.

14. Apparatus for cutting elongated flexible material into predetermined lengths as defined in claim 12, and wherein said cutter assembly is stationary and said pressure roller means moves around the cutter assembly and the pressure ring as the pressure roller means bears against the pressure ring, the pressure ring in turn being continuously eccentrically displaced and thus moved around the cutter assembly by the pressure roller means.

15. Apparatus for cutting elongated flexible material into predetermined lengths and comprising:
 a circular cutting assembly having a plurality of knives spaced around the cutter assembly with their edges facing radially outwardly;
 means for driving the cutter assembly in rotation, the rotating cutter assembly thereby continuously wrapping the flexible material in successive radially outwardly disposed layers around the cutter assembly with the innermost layer of material positioned in contact with the knife edges;
 freely movable means encompassing the continuously forming outer layer of material; and
 means adapted to bear against and urge the freely movable means into a pressure engagement against a portion of the continuously forming outer layers, the freely movable means being therefore driven in rotation by its engagement with the continuously forming outer layer of material, the continuously forming inner layer of material radially inwardly of the portion engaged by the freely movable means being moved inwardly of the knife edges and thus cut into said predetermined lengths.

16. Apparatus for cutting elongated flexible material into predetermined lengths and comprising:
 a circular cutting assembly having a plurality of knives spaced around the cutter assembly with their edges facing radially outwardly;
 means for continuously wrapping the flexible material in successive radially outwardly disposed layers around the cutter assembly with the innermost layer of material positioned in contact with the knife edges;
 freely movable means encompassing the continuously forming outer layer of material;
 pressure roller means adapted to bear against and urge the freely movable means into a pressure engagement against a portion of the continuously outer layer; and
 means for moving the pressure roller means around the cutter assembly and the freely movable means, the freely movable means being therefore moved in rotation and moved around the cutter assembly by its engagement on one side with the continuously forming outer layer of material and with the pressure roller means on the other side, the continuously forming inner layer of material radially inwardly of the portion engaged by the freely movable means being moved inwardly of the knife edges and thus cut into said predetermined lengths.

* * * * *

PO-1050
(5/69)

UNITED STATES PATENT OFFICE
CERTIFICATE OF CORRECTION

Patent No. 3,826,163                                    Dated July 30, 1974

Inventor(s) Albert E. Spaller and Bruce W. Stockbridge

It is certified that error appears in the above-identified patent and that said Letters Patent are hereby corrected as shown below:

In Column 2, line 47, delete "two" and insert ---tow---.

In Column 12, line 10, "$\emptyset = \text{Tan}^{-1} (R_2 \sin \theta / R_2 \cos \theta - e)$" should be changed to $$\text{---}\emptyset = \text{Tan}^{-1} \frac{R_2 \sin \theta}{R_2 \cos \theta - e} \text{---}$$

Signed and sealed this 4th day of March 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,826,163
DATED : July 30, 1974
INVENTOR(S) : Albert E. Spaller, Jr. and Bruce W. Stockbridge It is certified that error appears in the above—identified patent and that said Letters Patent is hereby corrected as shown below:

In column 11, line 53, change the formula to read as follows:

$$\Delta = \sqrt{(R_1 \sin \phi)^2 + [(R_1 + G + R_2) - R_1 \cos \phi]^2} - R_2$$

In column 12, line 11, after "G=" delete "$(R_1 + e) - R_2$"

and insert $R_2 - (R_1 + e)$

Signed and Sealed this

Twenty-ninth Day of July 1986

[SEAL]

Attest:

DONALD J. QUIGG

Attesting Officer

Commissioner of Patents and Trademarks